United States Patent
Dovetta et al.

(10) Patent No.: US 11,098,423 B2
(45) Date of Patent: Aug. 24, 2021

(54) INSULATING PRODUCT COMPRISING LOOSE-FILL MINERAL WOOL

(71) Applicant: SAINT-GOBAIN ISOVER, Courbevoie (FR)

(72) Inventors: Nicolas Dovetta, Bourg la reine (FR); Mathilde Siband, Paris (FR); Foucault De Francqueville, Issy les Moulineaux (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 374 days.

(21) Appl. No.: 16/066,762

(22) PCT Filed: Dec. 23, 2016

(86) PCT No.: PCT/FR2016/053660
§ 371 (c)(1),
(2) Date: Jun. 28, 2018

(87) PCT Pub. No.: WO2017/115044
PCT Pub. Date: Jul. 6, 2017

(65) Prior Publication Data
US 2019/0048499 A1 Feb. 14, 2019

(30) Foreign Application Priority Data
Dec. 29, 2015 (FR) ...................... 1563438

(51) Int. Cl.
| | |
|---|---|
| *C03C 13/06* | (2006.01) |
| *D04H 1/732* | (2012.01) |
| *D04H 1/4209* | (2012.01) |
| *D01G 9/00* | (2006.01) |
| *D04H 1/4218* | (2012.01) |

(52) U.S. Cl.
CPC ............ *D04H 1/732* (2013.01); *C03C 13/06* (2013.01); *D01G 9/00* (2013.01); *D04H 1/4209* (2013.01); *D04H 1/4218* (2013.01); *C03C 2213/00* (2013.01); *D10B 2101/06* (2013.01); *D10B 2101/08* (2013.01)

(58) Field of Classification Search
CPC .............................. D04H 1/732; C03C 13/06
See application file for complete search history.

(56) References Cited

U.S. PATENT DOCUMENTS

| | | | | |
|---|---|---|---|---|
| 2,808,929 | A * | 10/1957 | Fisher ...................... | B03B 4/04 209/36 |
| 2003/0116307 | A1 * | 6/2003 | Amadio ................ | E04B 1/7662 165/135 |

(Continued)

FOREIGN PATENT DOCUMENTS

| | | |
|---|---|---|
| EP | 2511586 A1 | 10/2012 |
| JP | 2006-97203 A | 4/2006 |

OTHER PUBLICATIONS

International Search Report dated Feb. 28, 2017, in PCT/FR2016/053660, filed Dec. 23, 2016.

*Primary Examiner* — Matthew E. Hoban
(74) *Attorney, Agent, or Firm* — Oblon, McClelland, Maier & Neustadt, L.L.P.

(57) ABSTRACT

Loose-fill insulating products include mineral wool, in particular glass wool or rock wool, in the form of down, nodules or flakes, which are obtained from a method including an aeration step that allows the mineral wool to be expanded.

20 Claims, 2 Drawing Sheets

(56) References Cited

U.S. PATENT DOCUMENTS

2006/0266429 A1 11/2006 Wagner et al.
2013/0193365 A1 8/2013 Ali
2013/0221567 A1 8/2013 Jorgensen et al.

* cited by examiner

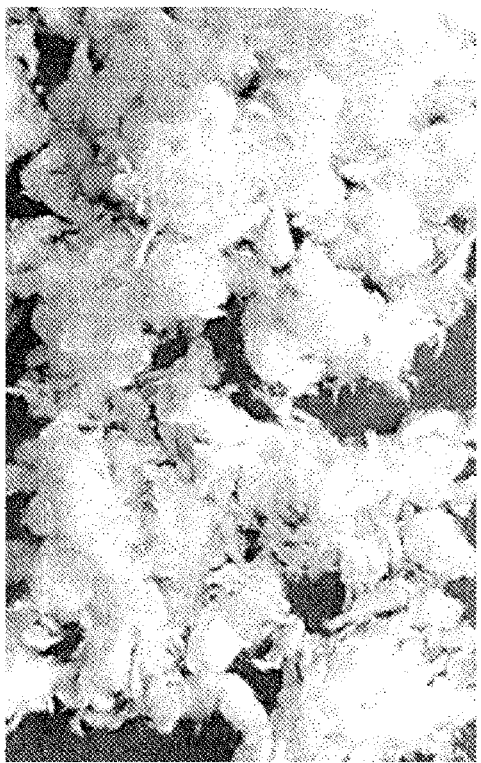
FIG. 1A
FIG. 1B
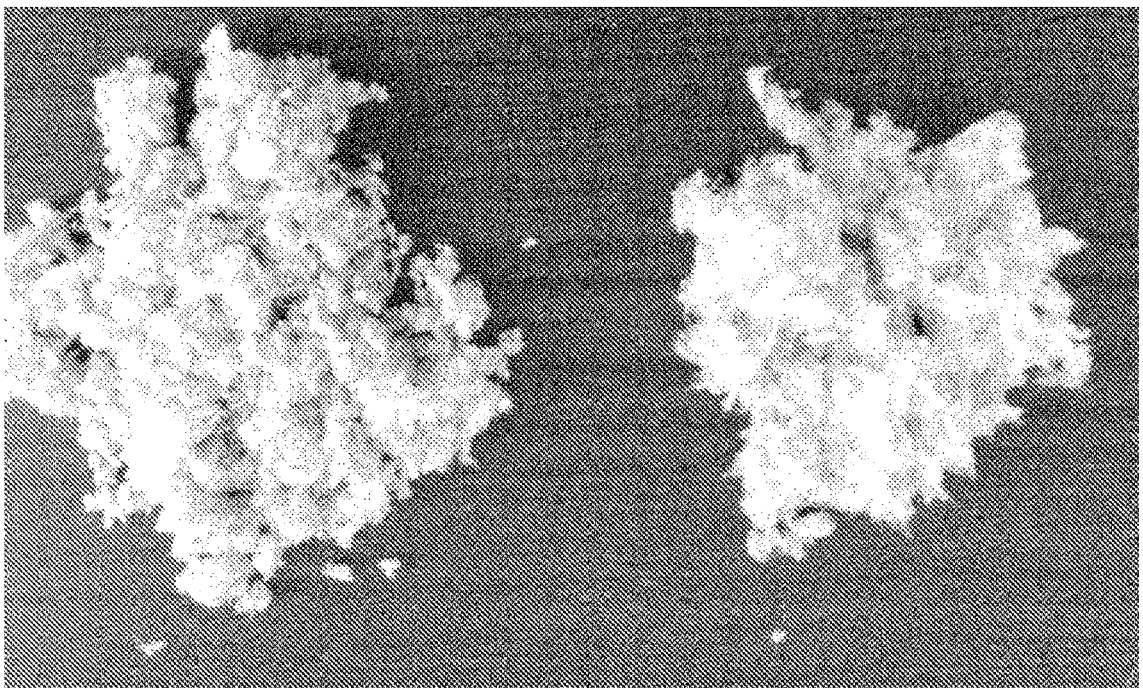
FIG. 2A                                    FIG. 2B

INSULATING PRODUCT COMPRISING LOOSE-FILL MINERAL WOOL

CROSS-REFERENCE TO RELATED APPLICATIONS

The present application is the national stage of international application PCT/FR2016/053660, filed on Dec. 23, 2016, and claims the benefit of the filing date of French Appl. No. 1563438, filed on Dec. 29, 2015.

TECHNICAL FIELD

The invention relates to an insulating product comprising mineral wool.

BACKGROUND OF THE INVENTION

Mineral wool is a very good thermal and sound insulator because it comprises entangled mineral fibers which give it a porous and elastic structure. Such a structure allows air to be trapped and noise to be absorbed or damped. Furthermore, mineral wool is manufactured essentially from mineral materials, in particular natural materials or recycled products (recycled glass) and is thus attractive from an environmental balance standpoint. Finally, because mineral wool is based on materials which are by nature non-combustible, it does not feed fire or spread flames. For preference, the mineral wool is selected from glass wool and rock wool.

A distinction is made between on the one hand insulating products of the panel or roll type which come in the form of sheets or mats of fibers, cohesion of which is ensured by a binder (also referred to as size) which binds the fibers together by discrete point adhesion, and, on the other hand, products of the loose-fill type which take the form of small bundles of entangled fibers that form particles on a centimeter scale, in which no bonding agent ensures the cohesion of the fibers in the bundles.

The manufacture of so-called loose-fill mineral wool comprises at least the following steps:
  a step of melting the raw materials such as glass in a melting furnace,
  a fiberizing step,
  a step of forming a mat of mineral wool,
  a step of nodulation using grinding.

The manufacture of loose-fill mineral wool may further comprise the following steps:
  a step of coating with agents such as antistatic agents and/or a cohesion additive, prior to, at the same time as, or following nodulation, and/or
  a bagging step.

At the end of the nodulation step, the mineral wool in the form of nodules or flakes may be used as such as a loose-fill insulating product or as loose-fill insulation, by spreading it, blowing it, or filling cavities with it. A loose-fill insulation corresponds, in the field of building, to a variety of materials offered in the form of small particles the texture of which varies from granular to flake like.

The mineral wool is advantageously used in the form of nodules or flakes as a main component in loose-fill insulating products for spaces that are difficult to access such as the floors of roof spaces not suitable for conversion which have not been developed or which are difficult to access.

These loose-fill insulating products are generally applied by mechanical blowing using a blowing machine which allows an insulating product to be sprayed over a surface or injected into a cavity from an outlet pipe. These loose-fill insulating products are therefore mainly installed by spraying them directly into the space that is to be insulated, such as roof spaces, or by injecting them into a wall cavity. These loose-fill insulating products are also referred to as blown insulating products.

The insulating product once blown needs to be as homogeneous as possible to avoid thermal bridging and thus improve the thermal performance. However, when the insulating product is blown in, whatever the diameter of the outlet pipe, the mineral wool in the form of nodules or flakes is not entirely homogenous. The thermal conductivity of the resulting insulating product is not optimized.

A number of solutions have been considered for improving the homogeneity of loose-fill insulating products along their pneumatic journey.

Patent Applications EP1165998 and US 2006/0266429 disclose flexible pipes which have mechanical means allowing the loose-fill insulation to be expanded as it is being installed. These mechanical means are projections extending over the internal surface of the pipes.

Application JP 2006/328609 discloses a complex method for expanding rock wool before storing it in a silo, comprising a step whereby agglomerations of fibers are carried by a turbulent airflow qualified by a Reynolds number of higher than 200,000, inside a duct provided with several series of needles and of zones in relief so that the agglomerates colliding therewith undergo mechanical opening.

These solutions, which are often excessively complex, are not entirely satisfactory.

BRIEF SUMMARY OF THE INVENTION

The applicant has developed a new preparation method that makes it possible to obtain an insulating product comprising mineral wool that has improved thermal performance.

The method of the invention comprises an aeration step inside a device comprising a chamber and at least one means capable of generating a turbulent gaseous flow.

During this aeration step, a stream of carrier gas is introduced into the chamber and a mineral wool in the form of nodules or flakes is subjected to the turbulent flow of this carrier gas with entrainment in one sense in a direction A and in the inverse sense in the direction B which is the opposite to the direction A so that within the chamber there is at least one plane perpendicular to the direction A in which the mineral wool entrained in the direction A crosses the mineral wool entrained in the direction B.

The profile of the mean speeds of the mineral wool in the flow in the direction A comprises at least one recirculation point at which the component of speed parallel to direction A is negative making it possible to generate the flow in the direction B. For preference, there are several recirculation points, so that one or more recirculation loops or bubbles is formed in the flow.

It will be noted that the method of the invention uses a turbulent flow in the unsteady state. The explanations given in the present application with regard to the speed profiles of the flows relate to the time-averaged speeds averaged over a duration sufficient to characterize the phenomenon observed.

This aeration step significantly decreases the density of the mineral wool in the form of nodules or flakes but above all homogenizes the structure thereof. Surprisingly, the expansion and/or homogenization of the mineral wool subjected to the aeration step of the invention is far better than that which can be obtained by the known methods of homogenization. The resulting insulating product can be compacted after the aeration step while maintaining a more homogeneous structure.

The improvement in thermal performance is manifested in particular, in relation to mineral wools not aerated according to the method of the invention, in a reduction in the thermal conductivity for the same density or in a reduction in the density for the same thermal conductivity. The resulting insulating products also, for the same density, have a far higher airflow resistance.

When the method is applied to existing mineral wool nodules, the invention makes it possible to expand the nodules or flakes so that it becomes practically impossible to determine the individual dimensions thereof. That can be demonstrated by a simple visual examination of the insulating products.

Thus, the loose-fill mineral wool according to the invention adopts a novel form, that can be qualified as down, because it is very similar to animal down covering materials. What is therefore meant by "down" in the present application is a loose-fill mineral wool product in which the fibers that make up the mineral wool are almost individualized, and the bundled structure of the flakes has been practically destroyed.

The mineral wool is chosen from glass wool or rock wool.

The glass wool is generally defined as being a product obtained from a molten mineral material derived from a mixture of vitrifiable raw materials and converted into a fiber by a method which is usually centrifugal spinning. Melting glass to a relatively viscous liquid form produces fibers that are relatively long and fine.

The rock wool is generally defined as being a product obtained from a molten mineral material derived from natural rocks and converted into a fiber by a method involving a series of rotating wheels. The melting of natural rocks into the form of a highly fluid liquid produces fibers that are relatively short and thick.

With rock wool, the down form may be difficult to achieve and the invention also covers flakes of rock wool of novel structure.

BRIEF DESCRIPTION OF THE DRAWINGS

FIG. 1 comprises photographs respectively depicting:
FIG. 1.A: a glass wool in the form of nodules or flakes that has not undergone the aeration step according to the invention and
FIG. 1.B: a glass wool in the form of down having undergone the aeration step according to the invention.
FIG. 2 comprises photographs respectively depicting:
FIG. 2.A: a rock wool in the form of nodules or flakes that has not undergone the aeration step according to the invention, and
FIG. 2.B: an "expanded" rock wool in the form of nodules or flakes which has undergone the aeration step according to the invention.
FIG. 3.A: a glass wool in the form of nodules or flakes that has not undergone the aeration step according to the invention, exhibiting a density of 10 kg/m³,
FIG. 3.B: an insulating product comprising loose-fill glass wool in the form of down which has undergone the aeration step according to the invention and exhibits a density of 4 kg/m³,
FIG. 3.C: an insulating product comprising loose-fill glass wool in the form of down having undergone the aeration step according to the invention and a compacting step, and having a density of 10 kg/m³.

DETAILED DESCRIPTION OF THE INVENTION

Figure 3A:
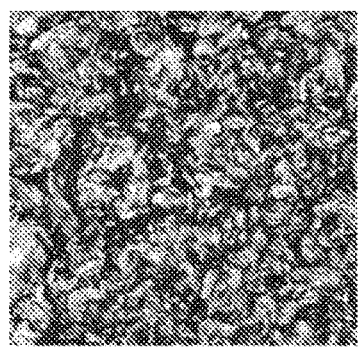
FIG. 3 comprises tomography images respectively illustrating.

The better homogeneity obtained by the method of the invention is clearly apparent from a simple visual examination of the insulating products. By contrast, the characterization of these novel products using their macroscopic and microscopic structure is difficult to establish. For this purpose, the applicant has developed a method for measuring agglomerate size distribution using vibrating screens, as set out hereinbelow.

The method of the invention makes it possible to expand glass wool and rock wool.

The invention relates to an insulating product in the form of down comprising loose-fill glass wool, characterized in that the mass distribution of the agglomerates which is obtained by screening 2 to 5 g of insulating product using a vibrating sieve shaker comprising a stack of screens and a maximum amplitude of oscillation of 3 mm set to between 1.5 and 2.5 mm, preferably to between 1.8 and 2.2 mm and better still to 2 mm for 5 minutes, exhibits:
  a mass percentage of agglomerates passing through the 6 mm screen of less than 5 wt %, preferably less than 3 wt % and/or
  a mass percentage of agglomerates passing through the 13 mm screen of less than 50 wt %, preferably less than 40 wt %, or even less than 35 wt %.

The invention relates to an insulating product comprising loose-fill rock wool in the form of down, nodules or flakes, characterized in that the mass distribution of the agglomerates which is obtained by screening 2 to 5 g of insulating product using a vibrating sieve shaker comprising a stack of screens and a maximum amplitude of oscillation of 3 mm set to between 1.5 and 2.5 mm, preferably to between 1.8 and 2.2 mm and better still to 2 mm for 5 minutes, satisfies the following relationship (% agglomerates 6-13)–(% agglomerates <6) 5%, where:
  (% agglomerates 6-13) corresponds to the mass percentage of agglomerates that pass through screens of both 6 mm and 13 mm and
  (% agglomerates<6) corresponds to the mass percentage of agglomerates passing through a 6 mm screen.

The insulating products according to the invention have far lower thermal conductivity and far higher airflow resistance. Another possible way of characterizing the products according to the invention may be based on the "thermal conductivity/density" pairing or on the "airflow resistance/density" pairing.

The invention also relates to an insulating product comprising loose-fill glass wool in the form of down, characterized in that it has a density "d" in kg/m³ and a thermal conductivity "λ" in mW·m⁻¹·K⁻¹ that satisfies the following relationship for densities d comprised between 7 and 14 kg/m³; $\lambda < A + 0.3d + 205/d$, where A is comprised between 17 and 23, inclusive of endpoints.

In the above equation, A has, in increasing order of preference, the value: 22, 21, 20, 19, 18 or 17, such that $\lambda<23+0.3d+205/d$, $\lambda<20+0.3d+205/d$ or $\lambda<18+0.3d+205/d$.

The invention also relates to an insulating product comprising loose-fill glass wool in the form of down, characterized in that it exhibits, for a density "d" comprised between 9.5 and 10.5 kg/m$^3$, a thermal conductivity "A" less than 42 mW·m$^{-1}$·K$^{-1}$, preferably less than 41 mW·m$^{-1}$·K$^{-1}$.

The invention also relates to an insulating product comprising loose-fill glass wool in the form of down, characterized in that it exhibits an airflow resistance (in accordance with standard EN29053) greater than or equal to 1 kPa·s/m$^2$, preferably greater than or equal to 2 kPa·s/m$^2$, preferably greater than or equal to 5 kPa·s/m$^2$, for a density comprised between 10 and 20 kg/m$^3$, preferably comprised between 10 and 15 kg/m$^3$.

The invention also relates to an insulating product comprising rock wool in the form of down, nodules or flakes characterized in that it exhibits a density "d" in kg/m$^2$ and a thermal conductivity "λ" in mW·m$^{-1}$·K$^{-1}$ that satisfy the following relationship for densities d comprised between 50 and 80 kg/m$^3$: $\lambda<-0.1d+45$; preferably $\lambda<-0.1d+44.5$; $\lambda<-0.1d+44$; $\lambda<-0.1d+43$.

The invention also relates to an insulating product comprising rock wool, characterized in that it exhibits an airflow resistance (according to standard EN29053):
  greater than or equal to 1 kPa·s/m$^2$, preferably greater than or equal to 2 kPa·s/m$^2$ or even greater than or equal to 3 kPa·s/m$^2$ for a density comprised between 40 and 50 kg/m$^3$ and/or
  greater than or equal to 10 kPa·s/m$^2$, preferably greater than or equal to 15 kPa·s/m$^2$ for a density comprised between 60 and 80 kg/m$^3$.

Finally, the invention relates to a method of thermal insulation by spraying an insulating product according to the invention directly onto a surface or injecting it into a cavity.

The preferred features featured in the remainder of the description are just as applicable to the various insulating products containing glass wool or rock wool as they are, where appropriate, to the method of insulation.

The insulating product according to the invention is essentially based on expanded mineral wool. In the present description:
  non-aerated mineral wool in the form of nodules or flakes is the name given to a mineral wool that does not have the novel structural features that can be obtained following an aeration step according to the invention,
  mineral wool in the form of expanded or aerated nodules or flakes or in the form of down is the name given to a mineral wool that has the novel structural features that can be obtained following an aeration step according to the invention.

The mineral wool is chosen from glass wool and rock wool.

Nodules or flakes of mineral wool are fibers in bundles rather than individualized fibers like textile glass fibers. These nodules or flakes of mineral wool have a length comprised between 0.05 and 5 cm, in particular between 0.1 and 1 cm. These flakes or nodules are formed of fibers which are entangled in the form of small bundles, small rovings, or "pilling". What is meant in the present description by the length of the flakes or nodules is the length of these bundles in their longest dimension.

Ideally, the mineral wool is expanded enough that the nodules and flakes can no longer be readily distinguished. When the insulating product comprises glass wool, the flakes or nodules can no longer be distinguished. The insulating product takes the form of down, namely of a product in the form of a layer of discontinuous fibers that remain laid or grouped together in a form similar to a fibrous web in which the fibers are simply entangled (rather than bound) in a loose and fluffy structure. Portions of the down or of the web can be picked up without the volumetric structure being affected.

The glass wool comprises glass fibers. Nodules or flakes of glass wool which are produced by the fiberizing of glass are described for example in patent EP 2 511 586 by means of a device in particular comprising a centrifuge or centrifugal spinner and a basket. A stream of molten glass is fed to the centrifuge and flows out into the basket. The glass wool fibers are formed into nodules in the way explained in document FR-A-2 661 687. These glass fibers are intertangled.

Glass wool fibers differ from so-called "textile" glass fibers which are obtained by the high-speed mechanical drawing of the molten glass in the form of a sized filament.

The glass wool exhibits, in increasing order of preference, a micronaire value:
  less than 20 L/min, less than 15 L/min, less than 12 L/min, less than 10 L/min,
  greater than 2 L/min, greater than 3 L/min, greater than 4 L/min, greater than 5 L/min.

The micronaire value is measured in accordance with the method described in document WO-A-03/098209.

The glass fibers of the glass wool are discontinuous. They have a mean diameter preferably less than 5 μm or even less than 4 μm.

The glass wool nodules or flakes are, for example, flakes made of glass wool of the type used for blown-wool insulation, for example of the type of wools marketed by the Saint-Gobain Isover companies under the tradenames Comblissimo® or Kretsull® or by the Certainteed company under the trade name Insulsafe®. These flakes generally have no binder and may contain anti-dust and/or antistatic additives such as oils. According to particular embodiments, the insulating product comprising glass wool conforms to one of more of the following features:
  the mass percentage of agglomerates passing through both the 25 mm and 32 mm screens with respect to the agglomerates passing through the 32 mm screen is less than 10 wt %, preferably less than 5 wt %, or even less than 3 wt %,
  the mass percentage of agglomerates passing through both the 19 mm and 25 mm screens with respect to the mass of agglomerates passing through the 32 mm screen is greater than 10 wt %, preferably greater than 20 wt %, greater than 30 wt % or even greater than 40 wt %,
  the mass percentage of agglomerates passing through both the 13 mm and 25 mm screens with respect to the mass of agglomerates passing through the 32 mm screen is greater than 50%, preferably greater than 55%, greater than 60%, greater than 70%.
  the mass percentage of agglomerates passing through both the 13 mm and 32 mm screens with respect to the mass of agglomerates passing through the 32 mm screen is greater than 60%, preferably greater than 65%, greater than 70%, greater than 80%.
  it comprises at least 75%, preferably at least 95% glass wool with respect to the total mass of the insulating product.

The rock wool comprises rock fibers. The rock wool has a fasonaire value of at least 250. This parameter, which is also referred to as the fineness index is measured in the way that is conventional in the field of rock wools. The fasonaire value is determined as follows: a test specimen (5 g) made up of a tuft of mineral wool free of oil and binder but which may contain non-fibrous components (nonfibers or "slugs" or "shots") is weighed. This test specimen is compressed to a given volume and has a stream of gas (dry air or nitrogen) kept at a constant flow rate passed through it. The fasonaire value measurement is then the loss in pressure head through the test specimen, evaluated by a water column graduated in conventional units. Conventionally, a fasonaire value result is the mean of the drops in pressure head observed across ten test specimens.

According to particular embodiments, the insulating product comprising rock wool conforms to one or more of following features:
  it satisfies the following relationship: (% agglomerates 6-13)−(% agglomerates<6) 10%,
  the mass percentage of agglomerates passing through the 6 mm screen is:
    less than 40%, less than 45%, less than 30%, and/or greater than 10%, greater than 20%.
  the mass percentage of agglomerates passing through the 13 mm screen is:
    less than 95%, less than 90%, less than 80%, and/or greater than 50%, greater than 60%, greater than 70%,
  the mass percentage of agglomerates passing through screens of both 6 mm and 13 mm is greater than 40%, preferably greater than 45%, greater than 50%, greater than 60%,
  the mass percentage of agglomerates passing through screens of both 6 mm and 19 mm is greater than 50%, preferably greater than 55%, greater than 60%, greater than 70%,
  the mass percentage of agglomerates passing through the 25 mm screen or the 34 mm screen is 100%,
  the rock wool comprises entangled mineral fibers with a fasonaire value of at least 250.

The insulating product comprises, in increasing order of preference, at least 75%, at least 80%, at least 85%, at least 90%, at least 94%, at least 95%, at least 96%, at least 97%, at least 98%, at least 99% mineral wool, preferably mineral wool chosen from glass wool and rock wool, with respect to the total mass of insulating product.

The insulating product comprises, in increasing order of preference, at least 75%, at least 80%, at least 85%, at least 90%, at least 94%, at least 95%, at least 96%, at least 97%, at least 98%, at least 99% of mineral fibers, preferably glass fibers or rock fibers, with respect to the total mass of insulating product.

The insulating product comprises, in increasing order of preference, at least 75%, at least 80%, at least 85%, at least 90%, at least 94%, at least 95%, at least 96%, at least 97%, at least 98%, at least 99% of mineral material with respect to the total mass of insulating product.

Finally, the invention also relates to a method of thermal insulation by spraying or blowing an insulating product according to the invention directly into the space that is to be insulated or by injecting an insulating product according to the invention into a cavity, in particular a wall cavity, or into any other hollow wall shape that is to be insulated.

I. Protocol for Measuring the Mass Distribution of Agglomerate Size

This measurement makes it possible to characterize the structure of the insulating products comprising mineral wool in particular glass or rock mineral wool. The principle behind the measurement is to set into vibration a stack of screens of different diameters and to sort the agglomerates (or solid particles) resulting from the vibration step according to their size.

A screen corresponds to a grid of greater or lesser mesh size, used to sort agglomerates and fixed to a frame. The screens are set in vibration using a sieve shaker corresponds to a vibrating apparatus on which the screens are installed.

Following the aeration step, it is sometimes impossible to determine the size of the nodules or of the flakes in particular when the insulating product comprises glass wool. The insulating product then takes the form of down, namely of a product in the form of a layer of discontinuous fibers deposited together in the form of a web (see FIG. 1.B) with an aerated and fluffy texture.

The mass-distribution measurement method is destructive because vibration tends to separate the down into agglomerates.

Likewise, even when nodules or flakes are still present after the aeration step, as may be the case with rock wool, the vibration may alter the dimensions thereof.

According to the invention, the term "agglomerate" is used to qualify the material recovered during the screening on each screen or in the container below. Thus a distinction is made between:
  nodules or flakes resulting from the method of manufacture of the mineral wool or that persist after the aeration step, and
  agglomerates obtained after the vibration.

1. Equipment and Instrumentation
  The equipment needed for this measurement comprises:
  a specimen of mineral wool, preferably blown,
  precision scales accurate to ±0.05 g,
  a plastic beaker with a capacity of approximately 500 mL,
  screens and a lower container (without holes),
  an automatic sieve shaker "Retsch Sieve Shaker" model RX-24.
  Screens 20 cm (8") in diameter with hole sizes as defined below were used:
  6 mm (0.25"),
  13 mm (0.5"),
  19 mm (0.75"),
  25 mm (1"),
  32 mm (1.25"),
  38 mm (1.5"),
  44 mm (1.75").

2. Procedure
  The following steps are performed:
  collect a representative specimen of aerated mineral wool or insulating product (referred to hereinafter as the sample) in a box measuring approximately 40×40×40 cm or more. The mineral wool must not be compressed while it is being handled or transported.
  weigh between 3.0 and 3.5 +/−0.1 g of product into the plastic beaker.
  stack up the screens on the sieve shaker from the smallest mesh size (6 mm) to the largest.
  delicately place the specimen on the top screen, namely the screen with the largest mesh size. It is important that a maximum surface area is covered in order to prevent large agglomerates from preventing the smaller ones from dropping through.
  place the lid on the stack of screens and tighten. If the screens are not properly centered and/or are poorly secured, the vibrations will be far too strong and will falsify the measurement.
  switch on the sieve shaker and set its power, and then set the measurement time to 5 min.

weigh the material on each of the screens once the vibration is complete. The mass percentage is calculated by dividing the mass of material on the relevant screen by the sum of the masses of all the screens.

The vibrating sieve shaker comprises a stack of screens and a maximum amplitude of oscillation of 3 mm. The amplitude of oscillation is set to between 1.5 and 2.5 mm, preferably between 1.8 and 2.2 mm, and better still to 2 mm. The vibrating lasts for 5 minutes. In order to obtain the desired amplitude of oscillation, the power of the sieve shaker is set. For example, the power of the sieve shaker is set to 65% when 4 screens are used and to between 45% and 65% and when 7 screens are used in order to obtain the same level of vibration.

3. Expressing the Results

The results are expressed in mass percentages per screen. Five measurements are taken with new samples at minimum. The mean and standard deviation are then calculated.

II. Examples

A glass wool and rock wool, both non-aerated and in the form of nodules or flakes, were used in these examples.

Before the aeration step, the glass wool in the form of nodules or nodules or flakes comprises glass fibers with a micronaire value of 5.6 L/min. It exhibits a density of 11.6 kg/m$^3$.

Before the aeration step, the rock wool in the form of nodules or flakes comprises rock fibers with a fasonaire value of 250. It exhibits a density of 74 kg/m$^3$.

Figure 5:
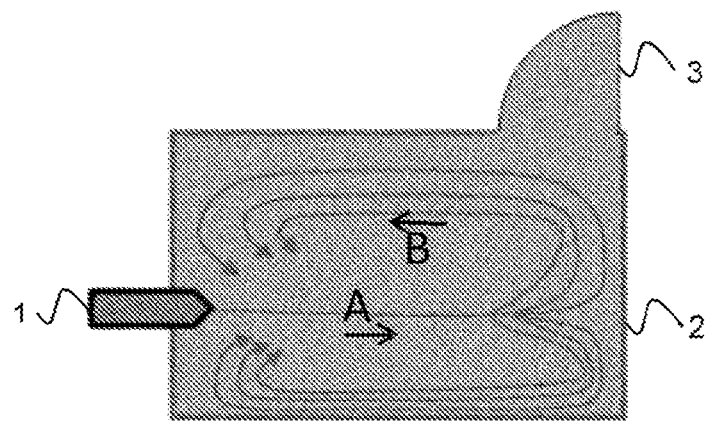
FIG. 5 exemplifies a device that makes it possible to perform the aeration step according to the invention.

A device that makes it possible to perform the aeration step according to the invention is illustrated in FIG. 5. This device comprises:
an air injection system 1 generating a first air jet,
a chamber 2,
an outlet opening 3.

The dimensions of this device are as follows: 30 cm×30 cm×40 cm with the longest side situated in the direction of the jet.

For the glass wool, the first air jet is a "high-pressure" jet with an inlet pressure of around 4 bar.

For the rock wool, the first air jet is a jet obtained from a blowing machine providing a sufficient inlet pressure.

The mineral wool in the form of nodules or flakes is introduced into the chamber 2 by means which have not been depicted. For example, approximately 100 g of glass wool is generally introduced. For rock wool, approximately the same quantity by volume is introduced.

The mineral wool in the form of nodules or flakes is then subjected to a turbulent flow by being entrained in a carrier gas in a direction A with the aid of a first high-pressure air jet generated by the air injection system 1.

The chamber is configured in such a way that a turbulent set of conditions capable of entraining the mineral wool in the carrier gas in the opposite sense in a direction B opposite to the direction A becomes established so that within the chamber there is at least one plane perpendicular to the direction A, in which mineral wool entrained in the direction A and mineral wool entrained in the opposite sense in the direction B cross one another. In FIGS. 1, A and B represent two speed vectors with the same direction and opposite sense. By convention, the speed along the vector A is said to be positive and the speed along the vector B is said to be negative.

Entrainment in a carrier gas in a direction B opposite to the direction A is the result of the choice of a suitable ratio between the cross section of the first jet and the size of the chamber.

When the profile of the mean speeds is represented, there is at least one (for preference) several recirculation points in the chamber where the component of the speed in the direction A is negative, which corresponds to a flow in the direction B and thus recirculation movements countercurrent to A.

This recirculation zone corresponds to a quantity "q" of mineral wool which at a given moment is going to go back in the opposite sense to the direction A and pass the same point at least twice. The streamlines drawn in FIG. 5 suggest that a quantity of mineral wool performs several loops passing through the same point several times.

The dimensions of the chamber are also tailored so that:
dimensions perpendicular to the direction of the initial jet are large enough to generate recirculation points in planes of the chamber and
the dimension parallel to the direction of the jet is small enough to multiple the recirculation movements.

When the mineral wool is sufficiently aerated, the insulating product is expelled from the chamber through the outlet opening 3, either by activation of an opening mechanism or because the chamber has been sized so that the residence time between the mineral wool entering and the outlet opening corresponds to the time needed to achieve the desired degree of homogenization.

In this way there is obtained an insulating product according to the invention comprising:
glass wool in the form of down, or
rock wool in the form of down or of expanded nodules or flakes.

This device allows 3 kg of insulating product comprising glass wool to be aerated per hour.

The insulating products according to the invention after the aeration step have low densities in particular of around 4 kg/m$^3$ for products based on glass wool and around 50 kg/m$^3$ for products based on rock wool. These products may if necessary undergo a compression step. The compression step may be performed by pressing the product between two plates.

The ratio of the density prior to aeration to the density after aeration is preferably higher than 2, preferably higher than 2.5. Density is very important in blown insulating products because it defines the coverage of the product corresponding to the area that can be covered with a given mass of product to a defined depth.

1. Visual and Tomographic Observations

FIGS. 1 and 2 comprise photographs respectively depicting:
FIG. 1.A: a glass wool in the form of nodules or flakes that has not undergone the aeration step according to the invention,
FIG. 1.B: an insulating product comprising loose-fill glass wool in the form of down having undergone the aeration step according to the invention,
FIG. 2.A: a rock wool in the form of nodules or flakes that has not undergone the aeration step according to the invention, and
FIG. 2.B: an insulating product comprising "expanded" rock wool in the form of nodules or flakes which has undergone the aeration step according to the invention.

These photographs show the better homogeneity of the insulating products obtained according to the invention.

Figure 3B:
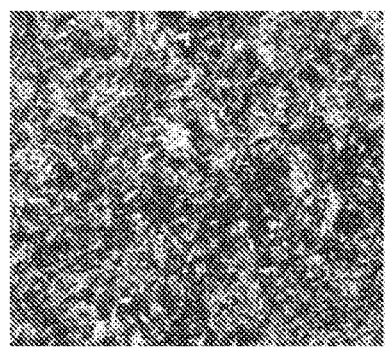
Figure 3C:
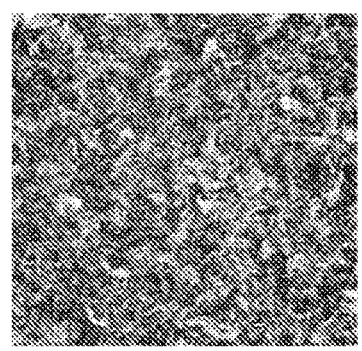

The tomography images in FIG. 3 respectively illustrate:
FIG. 3.A: a glass wool in the form of nodules or flakes that has not undergone the aeration step according to the invention, exhibiting a density of 10 kg/m$^3$, FIG. 3.B: an insulating product comprising loose-fill glass wool in the form of down which has undergone the aeration step according to the invention and exhibits a density of 4 kg/m$^3$, FIG. 3.C: an insulating product comprising loose-fill glass wool in the form of down having undergone the aeration step according to the invention and a compacting step, and having a density of 10 kg/m$^3$.

Figure 4:
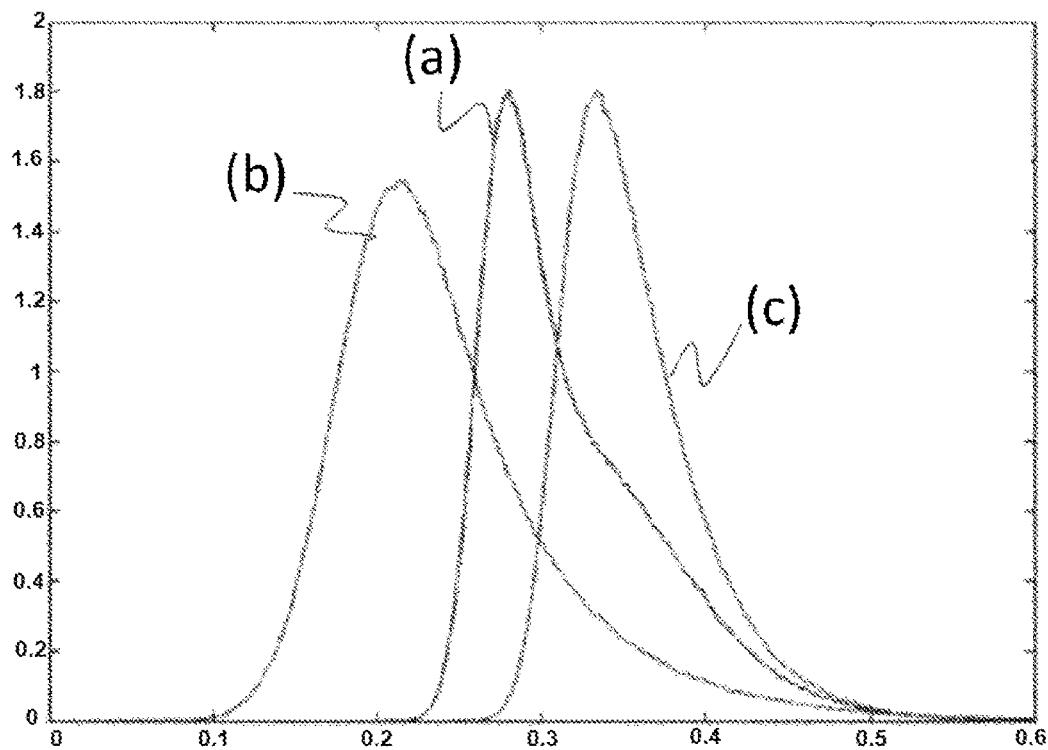
FIG. 4 represents variations in terms of grayscale level by volume with the abscissa axis plotting the intensity and the ordinate axis plotting the number of pixels exhibiting this intensity, and curves (a), (b) and (c) respectively corresponding to the insulating products of FIGS. 3.A, 3.B, and 3.

The processing of these images is illustrated by the graphic in FIG. 4 which represents the variations in terms of grayscale level by volume. The abscissa axis plots the intensity and the ordinate axis plots the number of pixels exhibiting this intensity. A point on the curve corresponds to the number of pixels found in the image at a given grayscale level. Curves (a), (b) and (c) respectively correspond to the insulating products of FIGS. 3.A, 3.B and 3.C.

These images and the processing of these images also show the better homogeneity of the insulating products according to the invention. That manifests itself in a better distribution in terms of gray scale levels. The insulating products according to the invention have broader and near-Gaussian peaks, whereas the non-aerated glass wool has a narrower and asymmetric distribution.

Finally, the insulating product that has undergone a compacting step following the aeration step, illustrated in image 3.C maintains its advantageous properties in terms of homogeneity. It is therefore possible thanks to the invention to obtain homogeneous insulating products of variable densities.

2. Measurement of the Mass Distribution of Agglomerate Size

The distribution of agglomerate size using the vibrating screens method was determined for the following products:
   PI LV A: an insulating product comprising aerated glass wool in the form of down,
   PI LV NA: an insulating product comprising non-aerated glass wool in the form of nodules or flakes,
   PI LR A: an insulating product comprising aerated rock wool in the form of nodules or of flakes,
   PI LR NA: an insulating product comprising non-aerated rock wool in the form of nodules or of flakes.

The insulating products comprising glass wool are in the form of loose-fill wool down. Now, the distribution measurement using vibrating screens separates the down into agglomerates. However, quantities, sometimes significant quantities, of material are found above the upper screens having hole sizes greater than or equal to 32 mm, namely, above the 32 mm, 38 mm and 44 mm screens. The presence and distribution of agglomerates above these screens is randomized. This is why, for the insulating products based on aerated glass wool, the mass distribution for agglomerates of a size of between 0 and 32 mm has also been calculated. For that purpose, the mass percentage is calculated by dividing the mass of material on the relevant screen by the sum of the masses of all of the material present underneath the screen the hole size of which is equal to 32 mm.

The other insulating products comprise 100% agglomerates which pass through a screen smaller than 32 mm. The distribution in terms of mass percentage extends between 0 and 32 mm.

Table 1 shows the results of the distribution as a mass percentage for insulating products based on glass wool:
   for agglomerates the size of which varies from 0 to over 44 mm,
   for agglomerates the size of which varies from 0 to 32 mm.

Table 2 comprises cumulative mass percentages and inverse cumulative mass percentages for insulating products based on glass wool with agglomerates passing through screens of 0 to over 44 mm.

Table 3 comprises the cumulative mass percentages and inverse cumulative mass percentages for insulating products based on glass wool with agglomerates passing through screens from 0 to 32 mm.

Table 4 comprises, for insulating products based on rock wool comprising agglomerates the size of which varies from 0 to 32 mm:
   the results of the distribution as mass percentages,
   the cumulative mass percentages.

When the mass distribution is represented graphically, the abscissa axis plotting the size of the agglomerates as a function of the screen through which they pass in increasing order, and the ordinate axis plotting the mass proportions, curves are obtained that exhibit one or two spikes. The spike of greatest height is qualified as the main spike.

The aeration step has the effect of shifting this spike to the right and of flattening it. That means that the aeration step increases the size of the agglomerates and makes the distribution more uniform in particular between 0 and 32 mm.

This different distribution appears to contribute to the better properties obtained in terms of thermal performance.

TABLE 1

| Product | Screen | Σ | <6 | [6; 13[ | [13; 19[ | [19; 25[ | [25; 32[ | [32; 38[ | [38; 44[ | >44 | Σ | <6 | [6; 13[ | [13; 19[ | [19; 25[ | [25; 32[ |
|---|---|---|---|---|---|---|---|---|---|---|---|---|---|---|---|---|
| | | | | | Distribution in % from 0 to more than 44 mm | | | | | | | | Distribution in % from 0 to 32 mm | | | |
| PI | 7 | 3.42 | 1% | 17% | 15% | 22% | 0% | 0% | 45% | | 1.89 | 1% | 31% | 27% | 40% | 0% |
| LV | 8 | 3.31 | 2% | 22% | 43% | 33% | 0% | 0% | 0% | 0% | 3.31 | 2% | 22% | 43% | 33% | 0% |
| A | 8 | 3.33 | 1% | 23% | 23% | 53% | 0% | 0% | 0% | 0% | 3.33 | 1% | 23% | 23% | 53% | 0% |
| | 8 | 3.44 | 1% | 16% | 57% | 14% | 12% | 0% | 0% | 0% | 3.44 | 1% | 16% | 57% | 14% | 12% |
| | 8 | 3.16 | 2% | 15% | 20% | 12% | 11% | 9% | 0% | 32% | 1.86 | 2% | 25% | 33% | 21% | 18% |
| | 8 | 3.55 | 2% | 17% | 46% | 3% | 2% | 7% | 24% | 0% | 2.46 | 2% | 25% | 66% | 4% | 3% |
| | 8 | 3.68 | 2% | 23% | 29% | 13% | 0% | 0% | 0% | 34% | 2.44 | 2% | 34% | 43% | 20% | 0% |
| | 8 | 3.64 | 1% | 16% | 17% | 5% | 0% | 0% | 0% | 61% | 1.42 | 1% | 42% | 44% | 13% | 0% |
| | 8 | 3.02 | 2% | 25% | 39% | 21% | 1% | 13% | 0% | 0% | 2.63 | 2% | 28% | 45% | 24% | 1% |
| | 8 | 3.65 | 1% | 25% | 31% | 22% | 0% | 0% | 0% | 21% | 2.90 | 1% | 32% | 39% | 28% | 0% |
| | 8 | 3.40 | 1% | 14% | 36% | 9% | 1% | 6% | 0% | 32% | 2.09 | 1% | 23% | 59% | 15% | 1% |
| PI | 5 | 3-3.5 | 4% | 58% | 13% | 0% | 25% | — | — | — | 3-3.5 | 4% | 58% | 13% | 0% | 25% |
| LV | 5 | 3-3.5 | 3% | 53% | 27% | 7% | 10% | — | — | — | 3-3.5 | 3% | 53% | 27% | 7% | 10% |
| NA | 5 | 3-3.5 | 6% | 65% | 22% | 5% | 2% | — | — | — | 3-3.5 | 6% | 65% | 22% | 5% | 2% |
| | 5 | 3-3.5 | 7% | 33% | 58% | 3% | 0% | — | — | — | 3-3.5 | 7% | 33% | 58% | 3% | 0% |
| | 5 | 3-3.5 | 6% | 38% | 49% | 6% | 0% | — | — | — | 3-3.5 | 6% | 38% | 49% | 6% | 0% |
| | 5 | 3-3.5 | 5% | 31% | 40% | 1% | 24% | — | — | — | 3-3.5 | 5% | 31% | 40% | 1% | 24% |
| | 5 | 3-3.5 | 6% | 54% | 11% | 3% | 26% | — | — | — | 3-3.5 | 6% | 54% | 11% | 3% | 26% |

TABLE 1-continued

| Product | Screen | Σ | <6 | [6; 13[ | [13; 19[ | [19; 25[ | [25; 32[ | [32; 38[ | [38; 44[ | >44 | Σ | <6 | [6; 13[ | [13; 19[ | [19; 25[ | [25; 32[ |
|---|---|---|---|---|---|---|---|---|---|---|---|---|---|---|---|---|
| | | | | | Distribution in % from 0 to more than 44 mm | | | | | | | | | Distribution in % from 0 to 32 mm | | |
| | 5 | 3-3.5 | 5% | 59% | 27% | 2% | 7% | — | — | — | 3-3.5 | 5% | 59% | 27% | 2% | 7% |
| | 5 | 3-3.5 | 5% | 58% | 29% | 0% | 8% | — | — | — | 3-3.5 | 5% | 58% | 29% | 0% | 8% |

* When the sieve shaker comprises 5 screens, the "[25; 32[" category corresponds to ">25 mm". In this case it is possible for a small quantity of agglomerate to be able to pass through a screen of 32 mm.

TABLE 2

| Product | Screen | Σ | <6 | [6; 13[ | [13; 19[ | [19; 25[ | [25; 32[ | [32; 38[ | [38; 44[ | >44 | <6 | [6; 13[ | [13; 19[ | [19; 25[ | [25; 32[ | [32; 38[ | [38; 44[ | >44 |
|---|---|---|---|---|---|---|---|---|---|---|---|---|---|---|---|---|---|---|
| | | | | Cumulative % from 0 to more than 44 mm | | | | | | | Inverse cumulative % from more than 44 to 0 | | | | | | | |
| PI | 7 | 3.42 | 1% | 18% | 33% | 55% | 55% | 55% | 100% | — | 100% | 99% | 82% | 67% | 45% | 45% | 45% | 0% |
| LV | 8 | 3.31 | 2% | 24% | 67% | 100% | 100% | 100% | 100% | 100% | 100% | 98% | 76% | 33% | 0% | 0% | 0% | 0% |
| A | 8 | 3.33 | 1% | 24% | 47% | 100% | 100% | 100% | 100% | 100% | 100% | 99% | 76% | 53% | 0% | 0% | 0% | 0% |
| | 8 | 3.44 | 1% | 17% | 74% | 88% | 100% | 100% | 100% | 100% | 100% | 99% | 83% | 26% | 12% | 0% | 0% | 0% |
| | 8 | 3.16 | 2% | 16% | 36% | 48% | 59% | 68% | 68% | 100% | 100% | 98% | 84% | 64% | 52% | 41% | 32% | 32% |
| | 8 | 3.55 | 2% | 19% | 65% | 67% | 69% | 76% | 100% | 100% | 100% | 98% | 81% | 35% | 33% | 31% | 24% | 0% |
| | 8 | 3.68 | 2% | 24% | 53% | 66% | 66% | 66% | 66% | 100% | 100% | 98% | 76% | 47% | 34% | 34% | 34% | 34% |
| | 8 | 3.64 | 1% | 17% | 34% | 39% | 39% | 39% | 39% | 100% | 100% | 99% | 83% | 66% | 61% | 61% | 61% | 61% |
| | 8 | 3.02 | 2% | 26% | 65% | 86% | 87% | 100% | 100% | 100% | 100% | 98% | 74% | 35% | 14% | 13% | 0% | 0% |
| | 8 | 3.65 | 1% | 26% | 57% | 79% | 79% | 79% | 79% | 100% | 100% | 99% | 74% | 43% | 21% | 21% | 21% | 21% |
| | 8 | 3.40 | 1% | 15% | 52% | 61% | 61% | 68% | 68% | 100% | 100% | 99% | 85% | 48% | 39% | 39% | 32% | 32% |
| PI | 5 | 3-3.5 | 4% | 62% | 75% | 75% | 100% | — | — | — | 100% | 96% | 38% | 25% | 25% | 0% | 0% | 0% |
| LV | 5 | 3-3.5 | 3% | 56% | 83% | 90% | 100% | — | — | — | 100% | 97% | 44% | 17% | 10% | 0% | 0% | 0% |
| NA | 5 | 3-3.5 | 6% | 72% | 93% | 98% | 100% | — | — | — | 100% | 94% | 28% | 7% | 2% | 0% | 0% | 0% |
| | 5 | 3-3.5 | 7% | 40% | 97% | 100% | 100% | — | — | — | 100% | 93% | 60% | 3% | 0% | 0% | 0% | 0% |
| | 5 | 3-3.5 | 6% | 44% | 94% | 100% | 100% | — | — | — | 100% | 94% | 56% | 6% | 0% | 0% | 0% | 0% |
| | 5 | 3-3.5 | 5% | 35% | 75% | 76% | 100% | — | — | — | 100% | 95% | 65% | 25% | 24% | 0% | 0% | 0% |
| | 5 | 3-3.5 | 6% | 60% | 71% | 74% | 100% | — | — | — | 100% | 94% | 40% | 29% | 26% | 0% | 0% | 0% |
| | 5 | 3-3.5 | 5% | 64% | 92% | 93% | 100% | — | — | — | 100% | 95% | 36% | 8% | 7% | 0% | 0% | 0% |
| | 5 | 3-3.5 | 5% | 63% | 92% | 92% | 100% | — | — | — | 100% | 95% | 37% | 8% | 8% | 0% | 0% | 0% |

TABLE 3

| Product | Screen | Σ | <6 | [6; 13[ | [13; 19[ | [19; 25[ | >25 | <6 | [6; 13[ | [13; 19[ | [19; 25[ | >25[ |
|---|---|---|---|---|---|---|---|---|---|---|---|---|
| | | | | Cumulative % from 0 to 32 mm | | | | Inverse cumulative % from more than 32 to 0 | | | | |
| PI | 7 | 1.89 | 1% | 32% | 59% | 99% | 99% | 99% | 98% | 67% | 40% | 0% |
| LV | 8 | 3.31 | 2% | 24% | 67% | 100% | 100% | 100% | 98% | 76% | 33% | 0% |
| A | 8 | 3.33 | 1% | 24% | 47% | 100% | 100% | 100% | 99% | 76% | 53% | 0% |
| | 8 | 3.44 | 1% | 17% | 74% | 88% | 100% | 100% | 99% | 83% | 26% | 12% |
| | 8 | 1.86 | 2% | 26% | 60% | 81% | 99% | 99% | 97% | 73% | 39% | 18% |
| | 8 | 2.46 | 2% | 26% | 93% | 96% | 99% | 99% | 98% | 73% | 7% | 3% |
| | 8 | 2.44 | 2% | 36% | 79% | 99% | 99% | 99% | 98% | 64% | 20% | 0% |
| | 8 | 1.42 | 1% | 43% | 86% | 99% | 99% | 99% | 99% | 56% | 13% | 0% |
| | 8 | 2.63 | 2% | 30% | 75% | 99% | 100% | 100% | 98% | 70% | 25% | 1% |
| | 8 | 2.90 | 1% | 33% | 72% | 100% | 100% | 100% | 99% | 67% | 28% | 0% |
| | 8 | 2.09 | 1% | 24% | 83% | 98% | 99% | 99% | 98% | 75% | 16% | 1% |
| PI | 5 | 3-3.5 | 4% | 62% | 75% | 75% | 100% | 100% | 96% | 38% | 25% | 25% |
| LV | 5 | 3-3.5 | 3% | 56% | 83% | 90% | 100% | 100% | 97% | 44% | 17% | 10% |
| NA | 5 | 3-3.5 | 6% | 72% | 93% | 98% | 100% | 100% | 94% | 28% | 7% | 2% |
| | 5 | 3-3.5 | 7% | 40% | 97% | 100% | 100% | 100% | 93% | 60% | 3% | 0% |
| | 5 | 3-3.5 | 6% | 44% | 94% | 100% | 100% | 100% | 94% | 56% | 6% | 0% |
| | 5 | 3-3.5 | 5% | 35% | 75% | 76% | 100% | 100% | 95% | 65% | 25% | 24% |
| | 5 | 3-3.5 | 6% | 60% | 71% | 74% | 100% | 100% | 94% | 40% | 29% | 26% |
| | 5 | 3-3.5 | 5% | 64% | 92% | 93% | 100% | 100% | 95% | 36% | 8% | 7% |
| | 5 | 3-3.5 | 5% | 63% | 92% | 92% | 100% | 100% | 95% | 37% | 8% | 8% |

TABLE 4

| Product | Screen | Σ | <6 | [6; 13[ | [13; 19[ | [19; 25[ | [25; 32[ | [32; 38[ | [38; 44[ | >44 | <6 | [6; 13[ | [13; 19[ | [19; 25[ | [25; 32[ |
|---|---|---|---|---|---|---|---|---|---|---|---|---|---|---|---|
| | | | | Distribution in % from 0 to more than 44 mm | | | | | | | Cumulative % from 0 to 32 mm | | | | |
| PI | 8 | 3.43 | 20% | 48% | 22% | 10% | 0% | 0% | 0% | 0% | 20% | 68% | 90% | 100% | 100% |
| LR | 8 | 3.45 | 40% | 52% | 8% | 0% | 0% | 0% | 0% | 0% | 40% | 92% | 100% | 100% | 100% |
| A | 8 | 3.52 | 22% | 43% | 36% | 0% | 0% | 0% | 0% | 0% | 22% | 64% | 100% | 100% | 100% |

TABLE 4-continued

| Product | Screen | Σ | <6 | [6; 13[ | [13; 19[ | [19; 25[ | [25; 32[ | [32; 38[ | [38; 44[ | >44 | <6 | [6; 13[ | [13; 19[ | [19; 25[ | [25; 32[ |
|---|---|---|---|---|---|---|---|---|---|---|---|---|---|---|---|
| | | | | | Distribution in % from 0 to more than 44 mm | | | | | | | Cumulative % from 0 to 32 mm | | | |
| | 8 | 3.47 | 31% | 49% | 7% | 13% | 0% | 0% | 0% | 0% | 31% | 80% | 87% | 100% | 100% |
| | 8 | 3.46 | 30% | 66% | 5% | 0% | 0% | 0% | 0% | 0% | 30% | 95% | 100% | 100% | 100% |
| PI | 8 | 3.50 | 38% | 42% | 8% | 12% | 0% | 0% | 0% | 0% | 38% | 80% | 88% | 100% | 100% |
| LR | 8 | 3.47 | 55% | 42% | 3% | 0% | 0% | 0% | 0% | 0% | 55% | 97% | 100% | 100% | 100% |
| NA | 8 | 3.39 | 72% | 28% | 0% | 0% | 0% | 0% | 0% | 0% | 72% | 100% | 100% | 100% | 100% |
| | 8 | 3.27 | 70% | 30% | 0% | 0% | 0% | 0% | 0% | 0% | 70% | 100% | 100% | 100% | 100% |
| | 8 | 3.53 | 76% | 24% | 0% | 0% | 0% | 0% | 0% | 0% | 76% | 100% | 100% | 100% | 100% |

3. Measuring the Thermal Conductivity and Airflow Resistance

The thermal conductivity measurements were taken in insulating products. The thermal conductivity A of a product is the ability of the product to allow a heat flux to pass though it; it is expressed in W/(m·K). The lower this conductivity, the more insulating the product is, and the better the thermal insulation therefore is. The values of thermal conductivity as a function of density were measured in accordance with standard EN14064.

Test specimens of the insulating product were conditioned to stabilize their weight at 23° C. for a relative humidity (RH) of around 50%. The measurements were taken at a mean temperature of 10° C. on an apparatus of R-matic type on cases of products measuring 590×590 mm, with a measured thickness squashed down of 108 mm. The actual measurement zone measured 254×254 mm. The mean thermal conductivity of the insulating products is given in the table below.

The airflow resistance measurements in accordance with standard EN29053 (method A) were taken on the same test specimens as were used for measuring the thermal conductivity.

Several glass wools and one rock wool were used for these tests.

The thermal conductivity and airflow resistance of the test specimen of insulating products defined hereinafter were measured:

PI LV1 NA: insulating product comprising glass wool of type 1, non-aerated,
PI LV1 A insulating product comprising glass wool of type 1, aerated,
PI LV2 NA: insulating product comprising glass wool of type 2, non-aerated,
PI LV2 A: insulating product comprising glass wool of type 2, aerated,
PI LV3 A: insulating product comprising glass wool of type 3, aerated,
PI LV4 A: insulating product comprising glass wool of type 4, aerated,
PI LR NA: insulating product comprising rock wool, non-aerated,
PI LR A: insulating product comprising rock wool, aerated.

| Product | Rs (Pa · s/m²) | 590 × 590 density (kg/m3) | 254 × 254 density (kg/m3) | Lambda (mW/(m · K)) |
|---|---|---|---|---|
| PILV1 NA | 590 | 9.3 | 9.6 | 50.7 |
| | — | 9.5 | 9.6 | 48.9 |
| PILV1 A | 5762 | 10.2 | 10.2 | 36.8 |
| | 4990 | 10.1 | 10.1 | 37.1 |
| | 5988 | 10.0 | 10.0 | 39.4 |
| | 6034 | 10.0 | 10.0 | 39.8 |
| | — | 10.1 | 10.1 | 39.8 |
| | 4990 | 9.9 | 9.9 | 40.4 |
| | 4310 | 9.7 | 9.7 | 40.7 |
| PILV2 NA | 1642 | 11.6 | 11.6 | 46.0 |
| PILV2 A | 1159 | 5.9 | 6.0 | 51.9 |
| | 5070 | 11.5 | 12.9 | 37.2 |
| PILV3 A | 628 | 4.1 | 4.1 | 59.3 |
| | 5311 | 10.2 | 12.0 | 36.8 |
| | 6132 | 10.1 | 11.5 | 37.1 |
| PILV4 A | — | 10.1 | 9.8 | 39.8 |
| | 6374 | 10.0 | 9.6 | 39.8 |
| | 6422 | 10.0 | 9.9 | 39.4 |
| | 5311 | 9.9 | 9.7 | 40.4 |
| | 4587 | 9.7 | 9.8 | 40.7 |
| | 435 | 2.9 | 3.0 | 78.9 |
| | 44615 | 29.5 | 31.2 | 31.6 |
| PILR NA | 5794 | 72.5 | 74.2 | 38.2 |
| PILR A | 3525 | 39.1 | 43.0 | 39.1 |
| | 18638 | 64.8 | 71.3 | 35.8 |

In terms of performance, the insulating products according to the invention obtained after the aeration step have a thermal conductivity which is very significantly lower.

The insulating products based on glass wool according to the invention all have a thermal conductivity far below 43 mW·m$^{-1}$·K$^{-1}$, or even for below 41 mW·m$^{-1}$·K$^{-1}$ for densities comprised between 9.5 and 10.5 kg/m³.

An insulating product comprising aerated glass wool exhibits an improvement in thermal conductivity of more than 15%, preferably more than 20%, by comparison with an insulating product comprising non-aerated glass wool for the same density. For a given performance, half as much glass wool is needed in order to obtain the same thermal resistance.

Effectively, the non-aerated glass wool in the form of nodules or flakes exhibits, for a density of 10 kg/m³, a thermal conductivity of around 53 mW·m$^{-1}$·K$^{1}$.

The insulating product according to the invention exhibits, for the same density, a thermal conductivity of around 37 mW·m$^{-1}$·K$^{1}$. That corresponds to a reduction of 16 mW·m$^{-1}$·K$^{-1}$ and a 30% increase in thermal resistance for the same blown thickness.

The insulating product according to the invention exhibits, for the same thermal conductivity, a density of 4.8 kg/m³. That corresponds to a reduction of 5.2 kg/m³, representing a material saving of 52%.

The invention claimed is:

1. An insulating product, comprising:
   loose-fill glass wool in the form of down,
   wherein a mass distribution of agglomerates obtained by screening 2 to 5 g of the insulating product using a vibrating sieve shaker comprising a stack of screens and a maximum amplitude of oscillation of 3 mm set to between 1.5 and 2.5 mm, exhibits:
   a mass percentage of agglomerates passing through a 6 mm screen of less than 5 wt %, and/or
   a mass percentage of agglomerates passing through a 13 mm screen of less than 50 wt %.

2. The insulating product of claim 1, wherein a mass percentage of agglomerates passing through both 25 mm and 32 mm screens with respect to the agglomerates passing through the 32 mm screen is less than 10 wt %.

3. The insulating product of claim 1, wherein a mass percentage of agglomerates passing through both 19 mm and 25 mm screens with respect to a mass of agglomerates passing through a 32 mm screen is greater than 10 wt %.

4. The insulating product of claim 1, wherein a mass percentage of agglomerates passing through both 13 mm and 25 mm screens with respect to a mass of agglomerates passing through a 32 mm screen is greater than 50%.

5. The insulating product of claim 1, wherein a mass percentage of agglomerates passing through both 13 mm and 32 mm screens with respect to a mass of agglomerates passing through the 32 mm screen is greater than 60%.

6. An insulating product, comprising:
   loose-fill glass wool in the form of down,
   wherein the insulating product has a density "d" in kg/m3 and a thermal conductivity "λ" in mW/(m·K) that satisfies the following relationship for densities d comprised between 7 and 14 kg/m$^3$;
   λ<A+0.3d+205/d, where A is comprised between 17 and 23, inclusive of endpoints.

7. An insulating product, comprising:
   loose-fill glass wool in the form of down,
   wherein the insulating product exhibits, for a density "d" comprised between 9.5 and 10.5 kg/m$^3$, a thermal conductivity "λ" less than 42 mW/(m·K).

8. An insulating product, comprising:
   loose-fill glass wool in the form of down,
   wherein the insulating product exhibits an airflow resistance greater than or equal to 1 kPa·s/m$^2$, for a density comprised between 10 and 20 kg/m$^3$.

9. The insulating product of claim 1, wherein the glass wool exhibits a micronaire value:
   less than 20 L/min, and
   greater than 2 L/min.

10. The insulating product of claim 1, comprising at least 75% glass wool with respect to the total mass of the insulating product.

11. The insulating product of claim 1, wherein the maximum amplitude of oscillation of 3 mm set to between 1.8 and 2.2 mm.

12. The insulating product of claim 1, wherein the maximum amplitude of oscillation of 3 mm set to 2 mm.

13. The insulating product of claim 1, wherein the wool is treated with a higher pressure than standard pressure.

14. The insulating product of claim 1, wherein a ratio of the density prior to aeration to the density after aeration is higher than 2.

15. The insulating product of claim 1, wherein a ratio of the density prior to aeration to the density after aeration is higher than 2.5.

16. The insulating product of claim 1, wherein the mass percentage of agglomerates passing through a 6 mm screen of less than 5 wt %.

17. The insulating product of claim 1, wherein the mass percentage of agglomerates passing through a 6 mm screen of less than 3 wt %.

18. The insulating product of claim 1, wherein the mass percentage of agglomerates passing through a 13 mm screen of less than 50 wt %.

19. The insulating product of claim 1, wherein the mass percentage of agglomerates passing through a 13 mm screen of less than 40 wt %.

20. The insulating product of claim 16, comprising at least 75 wt. % of mineral wool, with respect to total insulating product mass,
    wherein the mineral wool is selected from group consisting of the glass wool and rock wool.

* * * * *